United States Patent [19]

Passey, now by change of name Chand Arjun Passey

[11] 4,016,657
[45] Apr. 12, 1977

[54] HEAT PUMP FREEZE DRYING SYSTEM

[76] Inventor: Arjun Dev Passey, now by change of name Chand Arjun Passey, 3760 Gottingen St., Apartment B-201, Halifax, N. S., Canada, B3K 5K5

[22] Filed: Oct. 4, 1973

[21] Appl. No.: 403,437

Related U.S. Application Data

[62] Division of Ser. No. 162,607, July 14, 1971, abandoned.

[52] U.S. Cl. .................................. 34/92; 62/513; 62/324
[51] Int. Cl.² ...................................... F26B 13/30
[58] Field of Search ............... 34/5, 92; 62/513, 324

[56] References Cited

UNITED STATES PATENTS

| | | | |
|---|---|---|---|
| 2,737,032 | 3/1956 | Latham, Jr. | 62/513 X |
| 3,048,928 | 8/1962 | Copson et al. | 34/92 X |
| 3,270,432 | 9/1966 | Barbareschi | 34/92 |
| 3,376,652 | 4/1968 | Hernandez, Jr. | 62/324 X |
| 3,382,584 | 5/1968 | Blake et al. | 34/92 X |
| 3,552,140 | 1/1971 | Palmer | 62/324 |
| 3,574,950 | 4/1971 | Dantoni | 62/324 X |
| 3,621,587 | 11/1971 | Smith, Jr. | 34/92 |
| 3,633,283 | 1/1972 | Mishkin et al. | 34/92 X |
| 3,731,392 | 5/1973 | Gottfried | 34/92 |

Primary Examiner—Charles J. Myhre
Assistant Examiner—William C. Anderson

[57] ABSTRACT

The invention provides a "COORDINATED HEAT PUMP SYSTEM" which simultaneously satisfies the thermal needs of both the heat source and the heat sink. The heat pump system of the present invention is adapted to continuously withdraw heat from a heat source and continuously deliver heat at a required rate to a heat sink such that the ratio of heat delivered to heat withdrawn may be controlled by a cooling means, said heat pump system comprising a compressor adapted to compress at least a portion of refrigerant vapor from an evaporator thereof wherein a refrigerant withdraws heat from said heat source, a condenser in which refrigerant vapor so compressed is condensed and delivers heat at the required rate, cooling means for balancing the rates of heat delivery and heat withdrawal, and an expansion valve for expanding liquid refrigerant from said condenser into said evaporator. The invention also provides an evacuation system for use in vacuum drying having particular application to freeze-drying which comprises a system of absorber-regenerator-condenser units interlinked by coordinated heat pump systems whereby to provide for stable operation of the aforesaid freeze-drying operation and require a minimum of processing energy and power in the freeze-drying or vacuum drying process.

47 Claims, 3 Drawing Figures

HEAT PUMP FREEZE DRYING SYSTEM

This is a divisional application of my co-pending application Ser. No. 162,607, filed July 14, 1971 which is now abandoned.

The present invention relates to an improved heat pump system.

In a conventional vapor compression refrigeration system the purpose is to abstract heat at a desired rate from a heat source which is required to be refrigerated while rejecting heat to a heat sink at whatever rate is necessary in order to ensure said abstraction of heat from said heat source.

A conventional heat pump system is simply the said conventional refrigeration system but with a different purpose. In a conventional heat pump system the purpose is to deliver heat at a desired rate to a heat sink which is required to be supplied with heat while abstracting heat from a heat source at whatever rate is necessary in order to ensure said delivery of heat to said heat sink.

In a conventional heat pump or refrigeration system therefore heat is exchanged at a desired rate either with the heat sink or with the heat source but not at the desired rate with both the heat sink and te heat source. It has not been possible heretofore to exchange heat at the desired rates with both the heat sink and the heat source for the reason of lack of novel features disclosed hereinafter of which comprises the present invention.

There are numerous situations, freeze-drying being just one of such situations, in which it is necessary both to abstract heat from a heat source at a lower temperature and to deliver heat to a heat sink at a higher temperature, and wherein both these heat exchange operations must be continuously performed at the desired rates. My present invention of improved heat pump system accomplishes this task. I have called the heat pump system of my invention a "COORDINATED HEAT PUMP SYSTEM" because my heat pump system simultaneously satisfies the thermal needs of both the heat source and the heat sink. That is to say, the heat pump system of my present invention abstracts heat from the heat source at a rate at which it must be removed therefrom and it delivers heat to the heat sink at a compatible rate at which it must be supplied thereto so as to simultaneously satisfy the thermal needs of said heat source and said heat sink.

I shall hereinafter describe my heat pump invention with particular reference to a freeze-drying process by way of an example for the purpose of illustrating an application of my invention. My heat pump invention is therefore not to be deemed to be restricted to freeze-drying alone but it shall encompass all other applications as well. The manner in which the various objectives of my invention are achieved is set forth in the following description.

The basic concept in my heat pump invention is the method and means for balancing and coordinating the needs and requirements of the heat source and the heat sink. Without such a proper coordination, the heat pump can not be effeciently used. Depending upon the temperature levels and the thermodynamic properties of the refrigerant used, it is simple to determine for each situation the ratio of heat delivered to refrigeration performed in case of a conventional heat pump. An order of magnitude of this ratio can be reasonably estimated based on "Carnot Cycle". In conventional freeze-drying system with heat source for sublimation heat at 100° C and the surface condenser for the desublimation of water vapor at a moderate-40° C, the ratio of heat delivered to refrigeration performed is about 1.6 based upon the Carnot cycle and perhaps would be about 2.0 or more under actual operating conditions.

On the other hand, in actual practice, the rates at which heat has to be supplied and abstracted are of the same order of magnitude in the freeze-drying process. By practicing the method of balancing the needs and requirements of the heat sources and sinks according to the present invention by means of "subcooling means" one is able to adjust and control the system at all times to ensure a desired ratio between the heat delivered to heat sink and the refrigeration. performed (heat withdrawn) from the heat source by being able to modulate the amount of heat withdrawn from said heat source per unit amount of refrigerant vapor compressed by the heat pump compressor. A "cooling means " whereby a part of heat is withdrawn from said heat source by a natural cooling medium directly, or through the intermediary of a refrigerant as explained hereinafter, is another means used in the heat pump system of the present invention for achieving this modulation of the amount of heat withdrawn from said The heat pump system of the present invention is adapted to continuously withdraw heat from a heat source from which heat must be withdrawn and to continuously deliver heat to a heat sink where it is required, both the heat abstraction and heat delivery being effected at compatible desired rates.

The heat pump system of the present invention comprises a compressor adapted to compress at least a portion of refrigerant vapor coming by way of a suctin line from a evaporator wherein the refrigerant receives heat from said heat source and pass compresed refrigerant vapor to a first condenser wherein the compressed refrigerant vapor condenses by losing heat to the said heat sink. The condensed refrigerant leaves by way of a liquid line and is subcooled for the purpose of subcooling control by losing heat to a process stream and/or a natural heat sink, (i.e., an external heat sink) e.g. cooling water, in a cooling medium subcooler provided for this purpose. The partially subcooled liquid refrigerant leaves the subcooler by way of a liquid line in a thermodynamic condition compatiable with ensuring adequate superheating of the suction vapor in a liquid-vapor suction line heat exchanger which suction vapor enters the liquid-vapor suction line heat exchanger by way of a suction line and leaves by way of suction line adequately superheated on its way to the compressor. In passing through the liquid-vapor suction line heat exchanger, the partially subcooled liquid refrigerant is further subcooled by exchanging heat with the suction vapor which in turn gets superheated and the subcooled liquid refrigerant leaves by way of a liquid line on its way to the said evaporator.

Depending upon the prevailing temperature conditions or some other thermodynamic considerations, the sequence of subcooling in the cooling medium subcooler and in the liquid-vapor suction line heat exchanger may be interchanged.

On its way to the said evaporator, the subcooled liquid refrigerant is expanded by a first expansion valve. The expanded refrigerant exchanges heat with the heat source and thereby evaporates. The refrigerant vapor leaves the evaporator by way of a suction line.

In order to ensure a preliminary control of the ratio of heat delivered to heat withdrawn under steady state conditions, a proportioning by-pass valve bleeds just the right quantity of low pressure refrigerant vapor coming by way of the suction line from the evaporator to leave a sufficient quantity of refrigerant vapor along the suction line to the compressor so that the unbled fraction of suction vapor after sufficient superheating in passing through the liquid-vapor suction line heat exchanger follows the suction line to the compressor in order to be compressed to deliver heat at the required rate. The suction vapor that is bled by the proportioning by-pass control valve is handled depending upon its thermodynamic state to allow it to be condensed by exchanging heat with a heat sink such as cooling water. Compression of this bled vapor in a booster compressor may be necessary in some cases before it can be so condensed.

The bypassed refrigerant vapor follows a vapor line, is condensed in a second condenser, passes through a liquid line and is expanded by a second expansion valve into the said evaporator wherein it evaporates along with the liquid refrigerant expanded by the first expansion valve.

It has been found that the independent subcooling control achieved by means of partial subcooling in the cooling medium subcooler ensures control of the ratio of the heat delivered and the heat withdrawn, and this ratio can be conveniently made equal to desired value, for example equal to unity, which is the desired ratio in the case of drying applications.

The present invention shall be described in relation to the continuous vacuum drying, preferably freeze-drying, of materials such as foodstuffs including fruits ad vegetables and their juices as well as tea and coffee, and in particular coffee. In particular the present invention relates to a continuous freeze-drying process for the drying of particulate frozen material in which the drying rate is substantially increased and in which the temperature and vacuum pressure necessary to effect drying is relatively moderate providing for a substantial reduction in the cost of producing the freeze-dried material whilest at the same time maintaining product quality. The present invention also provides an evacuation system which is capable of continuous operation for use in removing vapor in a vacuum drying process particularly the aforesaid freeze-drying process of the present invention where it provides for stable operation thereof.

In the preservation and processing of materials such as foodstuffs and in paticular coffee, freeze-drying as compared to toher dehydration processes such as spray drying is being increasingly accepted as it has many advantages including the preservation of aroma, flavor, nutritional and functional values, the stability of well packaged products without refrigeration and ease of reconstitution. However, a major disadvantage with freeze-drying is the much higher processing costs and there is an ever-present requirement to substantially reduce the cost of freeze-drying material without substantially sacrificing product quality and stability. Thus at the present time freeze-drying is an expensive form of food preservation as compared with other dehydration methods such as spray drying. The primary reasons for high processing costs of conventional freeze-drying processes, such as batch and semi-continuous batch processes, are the heavy requirements in processing energy, power and other utilities in addition to the relatively large initial investment in the conventional freeze-drying plants, which are attributable to thermodynamic reasons, the batch nature of the operations, and the physical characteristics of the frozen material being dried, which characteristics adversely influence the operating parameters of the process. Thus in the conventional freeze-drying processes rate limitations imposed by heat and mass transfer considerations lead to high processing costs.

In the conventional commercial freeze-drying processes presently being operated the frozen material, in block or particulate form, is loaded suitably in trays into a vacuum chamber and heat is applied thereto from platens or from radiant sources and the water vapor generated during freeze-drying is removed as it is formed by means of an evacuation system, in particular surface condenser, which is usually located as near to the frozen material as possible to improve the efficiency of drying. Such a process operated on a batch basis with radiant heating of the top surface and simultaneous contact heating of the bottom surface under conditions conducive to freeze-drying provides an average drying rate of only about 1 mm of thickness per hour which corresponds to a drying rate of about 1 kg/hour-meter$^2$ of shelf area. In order to improve this low drying rate the freeze-drying industry has made numerous modifications in the plant including the use of movable platens in place of fixed plantens, the modification of the configuration of the platens and the trays, the vibrating of the trays, the fluidization of the particulate frozen material and the removal of dried material as it is formed on the blocks of freeze-drying material in the trays by scraping, and the operation of the process on a semi-continuous batch basis using a multi-cabinet system. However only partial success has been achieved and at the present time the drying rates achieved are still relatively low being less than 2 kilograms per hour per meter$^2$ and in many cases the higher rate of drying has been achieved by the sacrificing of product quality. Further in such processes it has been found necessary in order to increase the rate of drying to maintain a relatively low vacuum pressure in the drying chamber of the order of less than 250 millitors which requires substantial vacuum requipment and energy requirements and also in order to avoid melting in the frozen material with a consequent product deterioration it is necessary for the evacuation and cooling equipment to be capable of lowering the temperature and pressure in the chamber rapidly to the required operating levels which requires substantial additonal refrigeration plant and energy and in each operation the trays and ancillary equipment also has to be cooled and heated which requires the non-productive expenditure of energy, power and utilities by the equipment. Thus again in such process in order to obtain even the limited rate of drying it has been found that the concentration of material in the aqueous mixture to be frozen and subsequently freeze-dried should be low of the order of for example 20 to 25% for coffee as with high concentrations the dried layer on the drying material is compact and strongly retards the removal of water vapor from the frozen material being dried and thus a higher vacuum is necessary. Thus economically it has been found necessary to remove about 3 pounds of water for every pound of coffee produced by the freeze-drying process. Again, particularly in the semi-continuous batch process where the trays are moved into and out of the multi-cabinet system while this 
process provides for better utilization of the equipment, it does involve substantial labor costs, lost time and possible melting and deterioration of the frozen material and further long drying cycles coupled with temperature variations and delays between freezing and drying degrade the quality of the product and further the drying platens take up space in the drying chamber which detracts from the maximum utilization of the drying chamber in the drying process.

Other methods of effecting freeze-drying involving fluidization techniques using dehumidified air have been proposed but such processes are subject to the disadvantage of water vapor having to diffuse through the air and even at reduced pressue, drying rates have been achieved which are no better than with the commercial processes. Again atomizable materials have been prefrozen in non-slab, non-particulate form to take advantage of the reduced thickness of the frozen material in the hope of reducing the necessary exposure to freeze-drying conditions. In particular proposals have been made for freezing the atomizable material in the form of thin shells inside a rotating container, in the form of ribbons, in the form of flakes and tubes and in the form of thin films or thin shells. However again, the drying rates have not been substantially improved by these processes and such processes ae subject to inherent disadvantages which detract from their commercial applicability.

Thus it will be seen that in the conventional freeze-drying processes the frozen substance is transferred to a drying chamber of the freeze-drying plant for subsequent drying either in original or in modified form and the process invariably requires one or more of the following features: freezing the substance in a form which may be different from the one in which it is subsequently dried, handling and transportation of the frozen material to another section of the plant for subsequent drying and the necessity of substantial heating and vacuum systems and in addition to these factors low dring rates are achieved of less than 1 to 2 kilogram per hour per meter$^2$ which have caused freeze-drying to be a relatively costly process.

The present invention provides a freeze-drying process which is capable of effecting freeze-drying at substantially increased drying rates and in a preferred embodiment up to 7.5 kilogram per hour per meter$^2$ without substantial deterioration of the product and ensures a good guality protection during processing. At the same time the process of the present invention has minimum handling requirements and does not involve the use of trays and platens and further may be operated at a relatively moderate vacuum pressue of the order of about 200 millitorrs thus reducing the requirements of vacuum plant and energy required to operate the plant and at the same time may be operated at refrigeration temperature of about 0° C instead of temperature of about −40° C or below, thus reducing energy, power and other utilities requirements over the conventional freeze-drying process.

The present invention also provides an evacuation system particularly useful in the freeze-drying process of the present invention which is not subject to the frosting and defrosting problems usually associated with surface condensers as a means of water vapor disposal and possesses an inherent stability to permit stable operation of the freeze-drying process which is not always possible when employing conventional surface condensers.

According to the present invention therefore there is provided a continuous method of freeze-drying a material which method comprises passing said material in particulate frozen form through a drying chamber wherein is maintained a water vapor partial pressure below the triple point pressure of water, heating said particulate material in said chamber to cause sublimation of ice in said frozen material to effect drying thereof during said passage, substantially completely drying said material while it is in suspension within said chamber, and continuously withdrawing water vapor from said chamber and condensing said water vapor at a pressure lower than that maintained in said chamber.

While the particulate frozen material passed through the chamber may be formed externally of the chamber such as by method set forth for the conventional freeze-drying processes, e.g. freezing in non-particulate form such as in the form of blocks or flakes followed by crushing and sieving, in a preferred embodiment of the present invention the particulate material is formed in situ in the drying chamber in which the aqueous mixture of an atomizable material is atomized, by means of an atomizer. The atomized material freezes almost instantly due to the prevailing vaccuum conditions compatible with freeze-drying and the frozen particles can remain in the drying chamber until dried to the desired moisture content while they are still in suspension and settling. In particular in the process of the present invention after having received the necessary pretreatment the atomizable material to be freeze-dried is supplied to the atomization device of the chamber by means of normal feed-side equipment. The atomization device may be one or more pressure nozzles or centrifugal discs and is protected against potential hazards of freezing. When the partial pressure of the water vapor in the freeze-drying chamber is maintained below the triple point pressure of water, the material being atomized inside the drying chamber freezes almost instantly and this evaporation freezing is accompanied by uniform loss of about 12% to 20% of the moisture originally present thus resulting in a saving of energy and power. Moreover this instant freezing by atomization also prevents freezing damage resulting from the increasing concentration of solute. Thus, the almost instant evaporation freezing of the atomized material allows the particles to quickly pass through the temperature zone at 0° to −5° C usually responsible for product damage associated with slow cooling. The vacuum required in the drying chamber is a function of the characteristics of the substance being freeze-dried e.g. its minimum temperature for incipient melting, the characteristic of the dried layer and the expected maximum and minimum size of the particles.

Thus the apparatus for use in the process of the present invention includes one or more drying chambers of geometry consistent with the physical properties of the feed supplied to the atomizer, the desired physical properties of the product, the type of atomization equipment and other factors which directly or indirectly influence the performance. Providing adequate residence time and height to the drying particles is vitally important in the successful operation of the process of the present invention. The main drying zone must be high enough to allow the particles to dry to the desired level of moisture while they are still in suspension and large enough to avoid the atomized material from contacting the walls of the drying apparatus before the particles have dried to the required level. The main drying chamber is designed for the following classification of the drying particles. Those having a size below a critical value will be partially freeze-dried and carried away by the vapors leaving the drying chamber. Those of larger size will settle down in such a way that the largest particle will have dried to the desired moisture level while in suspension before reaching the lower zone of the drying chamber. The size of the largest particle is one of the factors influencing the dimensions of the drying chamber. Thus the particles larger than the critical size freeze-dry while in suspension in the main drying chamber and while settling down whereas the smaller particles are carried away by the water vapor and gases evolved in the drying chamber during the course of the drying. The water vapor exiting from the drying chamber and carrying the smaller particles is suitably passed through a separation device which may be any conventional device for separating solids from gases, by way of vacuum line where these smaller particles are separated from the vapor and subsequently dried to the desired moisture content. The water vapor then follows the vacuum line to a evacuation system for disposal of the water vapor.

The separation device for the separation of fine particles from the low pressure water vapor leaving the drying chamber may consist of one or more separation chambers operated in series or parallel. The separation chamber may be suitably designed cyclone/multicyclone or some other device such as a dynamic separator. In order to free water vapor from the fine particulate materials as completely as desired, the separation chamber may be followed by a section of filter bags or some other supplementary separation device. In the separation device the drying particulate material is suitably heated to effect the freeze-drying thereof.

The main drying chamber and the separation chamber are preferably provided with a shallow fluidized bed drying zone in their lower section through which dried particulate materials settle down. In the fluidized bed drying zone the particles not already dried to the desired residual moisture level may be further dried by losing moisture to the fluidizing vapors. Thus a portion of the water vapor leaving the separation equipment is suitably bled, slightly recompressed and reheated before being supplied to te shallow fluidized bed of the drying zone in the chambers where it serves as the fluidizing medium. This fluidizing water vapor subsequently mixes with the water vapor evolving from the drying particulate material thus increasing the water vapor in the chambers. This condition favors the suspension of the particulate material and permits the use of shorter drying chambers. In another embodiment of the present invention the particulate material may be removed from the drying and separation chambers by means of vacuum locks a led into a fuidized bed dryer disposed outside the chamber where the particles may be further dried in a shallow fluidized bed using the slightly recompressed and adequately reheated low pressure bled water vapor from the drying chamber. In comparison with conventional fluidized bed drying, this technique has the following advantages; inter alia one obtains better quality and better moisture control in the final produce, lower costs are involved in the drying and the required height of the chambers for a given drying capacity and residual moisture in the finished material is reduced. Alternatively, the slightly recompressed and reheated bled water vapor may be introduced directly into the main drying chamber to create a controlled turbulence therein which turbulence will also help to increase the heat transfer with and mass transfer from the drying particles in the drying chamber and provide an additional means of controlling the process making it more flexible.

Indirect heat exchangers stay inside the main drying chamber and separation chamber and provide the main source of heat with which the freeze-drying particles eventually exchange heat. Their design and position inside the chambers is preferably such as to not allow the heat exchanger to come into contact with or unduly obstruct the path of the freeze-drying particles. The heat exchanger should not cause an unreasonably large pressure loss in the flowing water vapor. The slightly recompressed ad reheated bled water vapor which may be introduced through the shallow fluidized bed drying zone and/or directly into the main drying chamber can serve as an additional source of heat for the drying particles.

In a preferred embodiment of the present invention infrared or microwave energy may also be used in the process and suitable combinations of heating media and such radiation may be used for supplying the necessary energy. Thus because of the limitations placed by the low rate at which heat can be transferred to the receding interface in the drying particulate material and of the relatively negligible resistance to mass transfer, the process of the present invention may be improved by modifying the thermal and transport properties of the dried layer, and especially by employing infrared and/or microwave energy. Further, since the process of the present invention is not rate limited with respect the mass transfer it presents several advantages in comparison with conventional processes limited with respect to mass transfer. Thus for example, higher pressures can be maintained in the drying chamber resulting in various direct and indirect benefits, a high concentration of solids can be permitted in the material to be freeze-dried, consequently increasing the throughput of the process when it is coupled with a gentle concentration process such as a freeze-concentration process.

The heating medium used in providing heat in the drying chamber and separation chamber will depend to a great extent upon the available resource. Thus when a sufficient quantity of steam in a suitable form and thermodynamic state is cheaply available, e.g. process or bled steam, it may be desirable to condense the steam in the heat exchangers in order to supply the heat of sublimation. However the heat in the drying chamber and separation chamber may be suitably provided from the evacuation system of the present invention particularly where cheap electricity is available, for example from hydroelectric or atomic power stations, or where fuel for raising steam may be in short supply or where adequate supply of natural heat sink, e.g. cooling water, is not available. In such situations the refrigeration and heat pump systems heat source per unit amount of refrigerant vapor compressed by the heat pump compressor. Of the evacuation system of the present invention assume geat importance.

Thus, according to a preferred embodiment of the present invention the heat for the sublimation in the drying and separation chambers is supplied from a novel heat pump system of the present invention, the heat source for this heat pump system being the compressed second refrigerant vapor from a absorbent refrigeration system (second heat pump means) which vapor condenses in a heat exchange means.

The evacuation system forms a critical part of any vacuum and/or freeze-drying process. In particular, in the evacuation systems the relative ratio of the surface area of the material to be dried to the surface area of the condensing surface is very important, and has to be usually less than one in order to ensure stable operation. Conventional surface condensers are subject to the major disadvantage that they are of fixed area and thus are not generally capable of providing the necessary continuous stable evacuation of the drying chamber in the freeze-drying process of the present invention. However, in the process of the present invention the surface area of the material to be dried is not fixed, i.e. is variable and is continuously being generated whereas the surface condenser would have a fixed condensing area and as such there can not always exist a proper balance between the rate of area generation for sublimation and the fixed surface of a surface condenser. For lack of a proper balance, if a fixed surface condenser were to be used in conjunction with the process of the present invention, after a short period of operation the surface condenser would become incapable of providing the necessary evacuation of the drying chamber. The present invention provides an evacuation system in which the condensing surface is being continuously generated and which is thus capable of handling the evacuation of the drying chamber is the process of the present invention. However, while the evacuation system fo the present invention is particularly suitable for operation in the freeze-drying process of the present invention, it is also applicable to any freeze-drying process with advantage and any vacuum drying process i.e. any process which requires vacuum pumping. The evacuation system of the present invention is also exempt from the frosting and defrosting problems usually associated with a surface condenser as a means of water vapor disposal. The feature of the evacuation system of the present invention is a properly controlled system of absorber-regenerator-condenser units interliked by means of refrigeration and heat pump systems employing heat source and main heat sinks found within the evacuation system of the present invention.

According to the present invention, therefore, there is provided an evacuation system (one or more of the first, second or third heat pump means) for continuously removing vapor from a vacuum drying chamber as it is generated in said chamber is vacuum drying of a material, said system comprising an absorber through which a liquid absorbent medium is continuously passed, said absorbent medium being at a sufficiently low temperature to provide in said absorber a vapor pressure substantially lower than in said chamber, whereby to cause vapor to rapidly pass from said chamber to said absorer and be absorbed in said absorbent medium, an evaporator in which liquid is continuously evaporated from the absorbent medium passing therethrough from said absorber, at a rate similar to that at which said vapor is absorbed in said absorbent medium in said absorber, by heat exchange with a condensing first refrigerant, a condenser in which vapor from said evaporator is condensed by heat exchange with evaporating first refrigerant, first heat pump means adapted to compress at least a portion of first refrigerant vapor from said condenser, preferably after suitable superheating thereof, pass the first refrigerant vapor so compressed to said evaporator and pass condensed first refrigerant from said evaporator through an expansion valve to said condenser, preferably after suitable subcooling thereof, said first heat pump means including cooling means for removing excess heat from first said refrigerant to maintain heat balance in said evaporator in said and condenser, and a chiller adapted to cool the heated absorbent medium from said evaporator to restore the absorbent medium to the desired temperature for said absorber by heat exchange with an evaporating second refrigerant for passage to said absorber.

The heat extracted by the chiller from the absorbent medium may be used in any manner as desired and may be passed by means of a second refrigerant in the chiller to a natural heat sink. However, according to a particularly preferred embodiment of the present invention at least a portion of the heat extracted from the absorbent medium in the chiller is used to heat the particulate material in the vacuum drying chamber or the separator or both. According to a particularly preferred embodiment of the present invention therefore the absorbent medium in the chiller is cooled by heat exchange with an evaporating second refrigerant, the evacuation system including second heat pump means adapted to compress at least a portion of second refrigerant vapor from said chiller, preferably after suitable superheating thereof, and pass the second refrigerant vapor so compressed to heat exchange means for heating the material in said chamber and passing the condensed second refrigerant from said heat exchange means through an expansion valve to said chiller, preferably after suitable subcooling thereof, said second heat pump means including cooling means for removing excess heat from said second refrigerant to maintain a heat balance in said chiller and in said heat exchange means.

The present invention also provides in combination with vacuum drying chamber the aforesaid evacuation system.

While in one embodiment of the evacuation system of the present invention at least a portion of the second refrigerant vapour from the chiller may be compressed in a compressor, preferably after suitable superheating thereof, and the so compressed second refrigerant vapour from the compressor may be used directly to supply heat in the vacuum drying chamber, it is preferably from a practical point of view, allowing for the efficiency of the compressor, to compress in stages which provide for maximum efficiency in the utilization of the compressors. Thus in a preferred embodiment of the present invention the heat exchange means comprises a cascade heat exchanger in which at least a portion of the compressed second refrigerant vapor is condensed while exchanging heat with an evaporation third refrigerant and third heat pump means is provided adapted to compress at least a portion of the vapor of the third refrigerant from said cascade heat exchanger, preferably after suitable superheating thereof, pass the so compressed third refrigerant vapor to a heat exchanger means of said chamber for heat exchange therein and pass condensed third refrigerant from said heat exchanger means of said chamber, preferably after suitable subcooling thereof, through an expansion valve to said cascade heat exchanger, said third heat pump means including cooling means for removing excess heat from said third refrigerant to maintain a heat balance in the cascade heat exchanger and in the said heat exchanger means of the said chamber.

The present invention provides a heat pump system adapted to continuously withdraw heat from a heat source and continuously deliver heat at a required rate to a heat sink such that the ratio of heat withdrawn to heat delivered may be controlled by a cooling means, said system comprising a compressor adapted to compress at least a portion of refrigerant vapor coming from an evaporator of the heat pump system wherein the refrigerant receives heat from said heat source, which heat source must lose heat, and pass compressed refrigerant vapor to a condenser of the heat pump system wherein the vapor condenses by losing heat to said heat sink, which heat sink must receive heat, and return condensed refrigerant to said evaporator through an expansion valve, and a cooling means adapted to modulate the amount of heat withdrawn from said heat source per unit amount of refrigerant vapor compressed by the heat pump compressor, in order to maintain a heat balance between the heat source and heat sink.

Suitably the cooling means in the heat pump system comprises a means for condensing a portion of the low pressure refrigerant vapor by heat exchange with a heat sink, such as cooling water in a water cooled heat exchanger, and recycling the so condensed refrigerant to said evaporator wherein said refrigerant receives heat from the heat source. Further, heat may also be removed from the heat pump means by means of a cooling medium subcooler (heat exchanger) located between the condenser of the heat pump and its expansion valve, i.e. by subcooling means, by losing heat to an external heat sink and thus provide subcooling of the liquid refrigerant in order to control the ratio of the heat delivered and the heat withdrawn. The heat source in the first heat pump means is the condensing water vapor, in the second heat pump means is the absorbent medium to be chilled and in the third heat pump means is the condensing second refrigerant.

The present invention thus provides properly controlled heat pump systems operating between properly selected heat sources and heat sinks. The heat source for the heat pump system of the present invention is always a comodity which must lose heat at a definite rate in order for the system to be fully operative e.g. the absorbent medium that must be cooled, or the vapor from the evaporator that can be condensed to serve as a heat source, or the condensing refrigerant in the cascade heat exchanger. The main heat sink for the heat pump system of the present invention is always a comodity which must receive heat in order for the invention to be fully operative e.g. the absorbent medium concentrating in the evaporator, or the system receiving sublimation or process heat.

Through proper selection of the heat sources and main heat sinks found within the drying system of the present invention, these heat pump systems are responsible for substantially eliminating the need for external heat sources for supplying the sublimation/process heat for drying and the process heat for regenerating the absorbent solution by evaporation and also contribute to other economic advantages including reduced thermal pollution of the environment, and conservation of natural resources.

Each of the first, second and third refrigerants are selected so as to be suitable for their particular application and may be the same or different. Thus while the first and third refrigerants may be the same refrigerants, preferably they are different from the second refrigerant and are more suitable for the temperatures involved in the process. Further the compressors in the first, second and third heat pump means may be single or multistage compressors and there may be one or a plurality of such compressors, and of evaporators, condensers, subcoolers, etc.

The evacuation system of the present invention has particular application to the freeze-drying of material such as foodstuffs and in particular coffee, whence water vapor is removed from the drying chamber and separation chamber and the absorbing medium is suitably an aqueous solution of a water vapor pressure depressant such as a glycol or a salt, e.g. a lithium halide, in particular lithium bromide.

The present invention will be further illustrated by way of the accompanying drawings in which.

Figure 1:
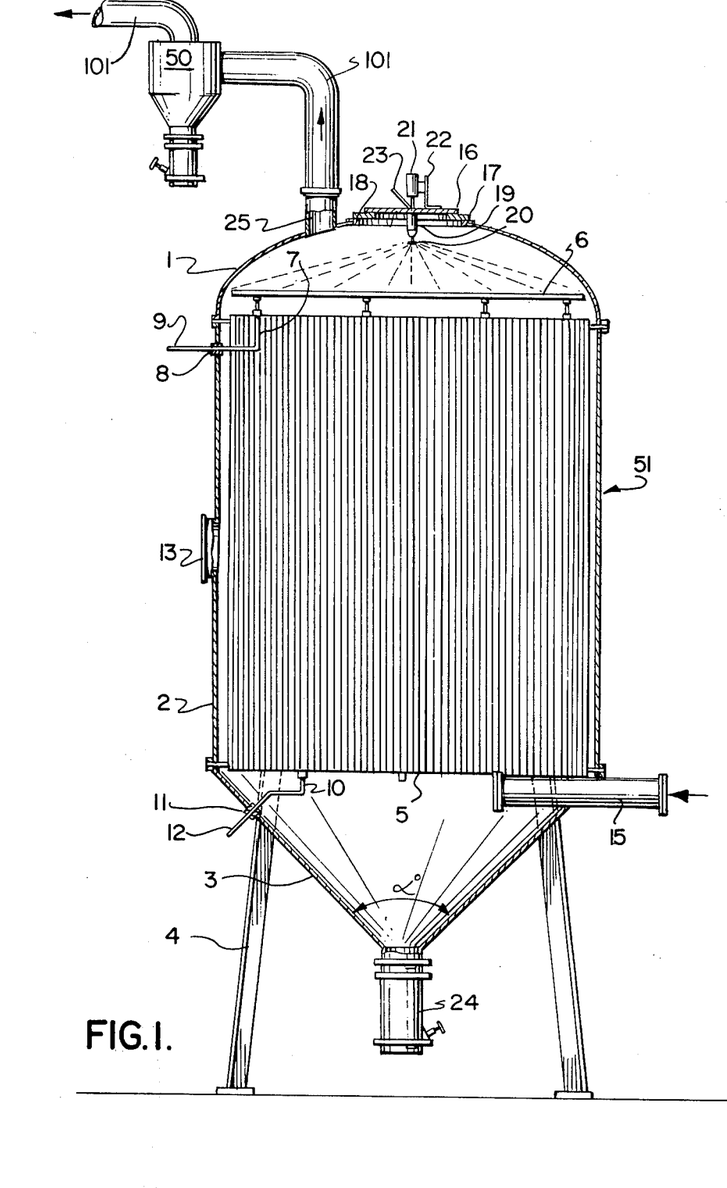
FIG. 1 is a cross-sectional diagramatic representation of an apparatus for use in the freeze-drying process of the present invention.

Referring firstly to FIG. 1, the drying chamber 51 comprises a cylindrical portion 2 and a conical portion 3 which are welded together to form a conical hopper. The chamber 51 is supported vertically by legs 4 and has a nozzle at the bottom of the hopper for accepting a demountable vacuum lock assembly 24 from which the freeze-dried product is withdrawn. The hopper is closed by a demountable head 1 to form the drying chamber 51. The vacuum drying chamber 51 includes vacuum-proof windows 13 which may serve for inspection or manholes and includes one or more nozzles 15 with demountable flanges which are used to introduce vapors and/or gases as a means to influence the process occurring in the chamber 51. These nozzles 15 may also be used for introducing infrared or microwave energy in which case the chamber 51 would act as a microwave or infrared oven operating under vacuum. The chamber 51 is provided with one or more nozzles 25 through which water vapor and gases are removed from the chamber 51 and their positioning in the chamber 51 near the top end allows an overall vertically upward flow of vapors surrounding the particulate material and in so doing aids in the suspension of the particles in the chamber 51. The nozzles 25 instead of being welded onto the head as shown may alternatively be welded to one or more annular or partly annular vacuum ducts which may be used to exhaust the vapors and gases from the vacuum chamber 51.

The angle alpha ($\alpha°$) of the conical portion 3 depends upon the flow characteristics of the product and is small enough to provide a slope compatible with an easy flow of material. The head 1 of the vacuum chamber has an opening in the flange 18 welded to it, the opening being made large enough to function as a manhole if there should be a need. This opening is closed by flange 17 which in turn has an opening to allow entry to an atomization system mounted on flange 16. The demountable flanges 16 and 17 provide a means for supporting the atomization system designed for operation compatible with the vacuum conditions prevailing in the drying chamber. This atomization system is shown as a centrifugal disc atomization system.

Adapter 19 allows an externally mounted electric motor 21 to drive the disc 20 of the centrifugal disc atomization system. The adapter 19 also serves to bring in feed of aqueous atomizable material to the disk 20 by way of feed line 23. The electric motor 21 is supported in bracket 22. It is within the scope of the present invention to use any other means or prime mover to operate the centrifugal disc atomizer or even employ under some conditions pressure nozzles or any other means for atomization. The choice of whether to use one or more atomization devices and their placement in relation to the drying chamber is governed by the size of the chamber 51 and the particular conditions in the chamber 51. In some cases, it may be advantageous to install pressure nozzles near the bottom end and spray in an upward direction. The vacuum chamber is provided with a heat exchanger 5 and heating medium is brought to the heat exchanger by way of conduit 9. Heating medium inlet coupling 8 provides a vacuum-proof connection between the conduit 9 and conduit 7, the latter serving to bring the heating medium to the distribution header 6. After adequately traversing the heat exchanger 5 the heating medium leaves the heat exchanger 5 by way of conduit 10, heating medium exit coupling 11 providing a vacuum-proof connection between the conduit 10 and conduit 12. The conduit 12 serves to carry the heating medium from the chamber for future use e.g. return to the third heat pump means of the evacuation system as will be explained hereinafter. Also the conical portion 3 of the chamber 51 may be heated if desired.

Figure 2:
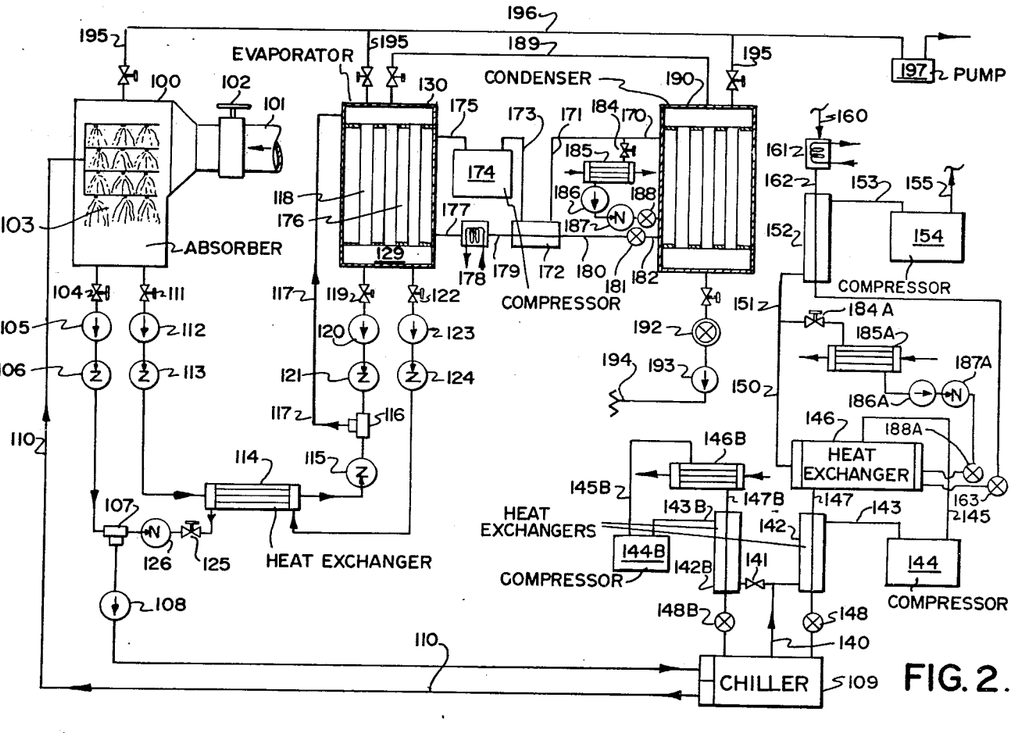
FIG. 2 is a flow diagram of an evacuation system incorporating the heat pump systems according to one embodiment of the present invention for use in the freeze-drying process of FIG. 1.

The atomizable substance, e.g. the coffee extract, suitably at a concentration of 40 to 50 %, after receiving any required pretreatment is fed to the chamber 51 by way of feed line 23 which on reaching the spinning disc 20 of the centrifugal disc atomization system is atomized. The atomized material freezes almost instantly due to the prevailing vacuum conditions compatible with freeze-drying and the frozen particles that remain in the drying chamber dry to the desired moisture content while they are still in suspension and settling. Particles that leave the drying chamber through outlet 25 with water vapor are led to the separation equipment 50, such as a cyclone separator wherein these smaller particles are separated from the vapors and are subsequently dried to the desired moisture content, the separator being provided with the necessary heat for drying by means of the third refrigerant from the third heat pump means of the evacuation system.

The larger particles separated in the drying chamber and the small particles separated in the separator settle down into respective shallow fluidized bed zones and these particles leave the respective chambers 51 and 50 through suitable vacuum lock means into a product handling system.

From the vapors that leave the separator 50 a portion may be bled for recirculation to the chamber 51 and/or the separator 50 and the remaining vapors are led via vacuum line 101 as shown in FIG. 2 through valve 102 to an absorber 100.

Referring to FIG. 2 the absorption of water vapor is accomplished in absorber 100 by a suitable absorbent such as a chilled aqueous solution of lithium bromide. The absorbent solution is maintained at the desired temperature by recirculating it through an absorbent chiller 109 and is maintained at the desired concentration by regeneration of the absorbent solution in evaporator 130. The control of the temperature and concentration of the absorbent solution is to maintain sufficiently low vapor pressure in the absorber 100 in order to overcome the resistance of the vacuum line 101 to the flow of vapors between the drying chamber 51 and the absorber 100. Thus the temperature and concentration of the absorbent solution serves as an external means to control the vapor pressure in the drying chamber 51. With the freeze-drying process of the present invention, the vapor pressure in the drying chamber 51 could advantageously be compatible for convective heat transfer with maintaining a vapor pressure on the particle surface at least equal to the optimum vapor pressure based on residence height if this condition does not conflict with the constraints placed by the material to be freeze-dried. For the case of convective heat transfer to the particles, the vapor pressure on the particle surface should be 1,800 millitorrs or more for 250 micron particles, but for small particles of 100 to 200 mircons the vapor pressure is not so critical and may be between 1,500 and 4,000 millitorrs. A vapor pressure of 500 millitorrs in the absorber 100 is consequently adequately low and can be expeditiously maintained by chilling the lithium bromide solution to about o° C. A chart giving the vapor pressure-temperature-concentration data on aqueous lithium bromide solution is available in ASHRAE Guide and Data Book, page 15, 1965.

The water vapor coming from the drying and separation chambers by way of vacuum line 101 passes through vacuum valve 102 and enters absorber 100 where it is subsequently uniformly distributed and absorbed by spray 103 of the chilled concentrated absorbent solution. Although the absorber 100 in FIG. 2 is shown as a spray tower it may be any type of absorption equipment compatible with the overall process.

Pump 108 draws in a mixture of concentrated absorbent solution returning from evaporator-regenerator 130 through valves 125 and 126 and a dilute absorbent solution from the absorber 100 through valve 104, pump 105 and valve 106. Mixing has previously occurred in the mixing valve 107 in the desired proportions. The absorbent solution returning from evaporator-regenerator 130 is circulated by pump 123 through flow control valve 122 and check valve 124 on its way to the mixing valve 107. The rate of flow of absorbent solution through chiller 109 is preferably kept stable at an optimum design value. The pump 108 forces the absorbent solution through the tubes of the absorbent chiller 109 in which a refrigerant (the second refrigerant) is evaporating on the shell side. The chilled concentrated absorbent solution is then passed through line 110 and is suitably distributed and dispersed in the absorber 100 in order to effect optimum rate of generation of absorption area per unit volume. The water vapor is thereby absorbed and as a result the absorbent solution becomes diluted and heated. Some heated and diluted absorbent solution is withdrawn at a suitable rate through the proportioning control valve 104 in order to be pumped by the pump 105 into the mixing valve 107 in which it mixes with the concentrated solution returning from the evaporator-regenerator 130. The mixture is then returned to the absorber 100 after being chilled in the chiller 109 in order to repeat the cycle.

A portion of the heated and diluted absorbent solution corresponding to the difference between the rate of chilled absorbent solution supplied to the absorber 100 plus the rate of absorption of water vapor and the rate at which a portion leaves the absorber 100 through valve 104 is withdrawn from the absorber 100 through valve 111 by means of pump 112. On its way to the evaporator-regenerator 130 this dilute absorbent solution passes via a check valve 113 through a heat exchanger 114 in which it gains heat from the concentrated absorbent solution returning from the evaporator-regenerator 130. As a result of this exchange, the concentrated absorbent solution is cooled while the dilute absorbent solution is heated. This heat exchange therefore helps reducing the power requirements during the subsequent reconcentration as well as chilling operations. From this heat exhanger 114, the partially heated dilute absorbent solution follows a line leading it through check valve 115 to a mixing valve 116 and in this mixing valve the absorbent solution coming from the absorber 100, mixes with the absorbent solution recirculated by pump 120 as explained hereinafter and from the mixing valve 116 the absorbent solution passes through line 117 to evaporator-regenerator 130.

The evaporator-regenerator 130 although shown as an agitated falling film shell and tube type evaporator may be of any other design compatible with the overall process. The absorbent solution entering the evaporator-regenerator 130 is uniformly distributed and descends in thin films on the inside of the tubes 118 exchanging heat with the refrigerant vapor of a heat pump system (first heat pump means) condensing on the shell side 176 of the evaporator 130 at a suitable temperature for example about 104° C. Some of the water contained in the concentrating absorbent solution is thereby evaporated at a vapor pressure of about 120 torrs and a concentrated absorbent solution collects in evaporator-regenerator sump 129. In order to maintain steady state operating conditions the concentrated absorbent solution is returned to the mixing valve 107 at the same rate as it is withdrawn from the absorber 100 by pump 112 for supplying it to the evaporator-regenerator 130 less the rate of evaporation in said evaporator-regenerator. This returning concentrated absorbent solution is cooled on the way in heat exchanger 114 as explained heretofore.

To aid in the regeneration of the concentrated absorbent solution it may be desirable to recirculate the concentrated absorbent solution through the evaporator-regenerator tubes. In order to accomplish this, a portion of the absorbent solution is continuously withdrawn from the evaporator-regenerator sump 129 through valve 119 by means of pump 120. This pump sends it through check valve 121 to the mixing valve 116 where it mixes with the dilute absorbent solution coming from the absorber 100 via heat exchanger 114 as explained heretofore.

The water vapor evolved from the concentrating absorbent solution leaves the evaporator-regenerator 130 by way of line 189 and is led to a cascade condenser 190 which although illustrated as a vertical shell and tube condenser could be of any other design compatible with the overall process. In this cascade condenser 190 the incoming water vapor condenses on the tube side at a temperature of about 55° C which is governed by thermodynamic considerations. The condensing water vapor loses heat to a (first refrigerant) refrigerant evaporating on the shell side at a suitable temperature in order to maintain the desired condensation temperature on the tube side. A heat pump system (first heat pump means) uses the vapor of the evaporating first refrigerant for supplying the compressed first refrigerant vapor to the evaporator-regenerator 130 where it condenses on the shell side in order to provide the heat necessary for the absorbent regeneration. The condensed water is removed from the cascade condenser 190 by means of pump 193 through trap 192 and is discharged along the line 194. This condensate represents a potential source of available heat which can be used to supply process heat wherever needed.

The heat delivered by a heat pump may be reduced by decreasing the rate of vapor compression by the main heat pump compressor. This is achieved by allowing a suitable fraction of the suction vapor to bypass the main compressor of the heat pump system. The quantity of suction vapor thus bypassed is proportionally controlled to permit enough vapor to be compressed by the main compressor in order to deliver heat at the desired or needed rate. The suction vapor bypassing the main compressor is condensed by losing heat to a natural heat sink (i.e. an external heat sink) such as cooling water. Compression of this vapor in a booster compressor may be necessary in some cases before it can be so condensed, the liquid refrigerant formed by condensing the bypassed refrigerant vapor is returned to the corresponding evaporator by suitable means.

The absorbent refrigeration system (second heat pump means) is designed to chill the absorbent solution to a proper temperature for example 0° C in order to maintain a water vapor pressure of about 500 millitorrs in the absorber 100. Indeed a temperature to which the absorbent solution needs to be chilled depends upon thermodynamic considerations of the absorption-regeneration process, and the water vapor partial pressure to be maintained in the system.

The liquid second refrigerant after having been subcooled in liquid-vapor suction line heat exchangers 142 and 142B is expanded on the shell side of the shell and tube evaporator i.e. absorbent chiller 109. This expanded refrigerant evaporates on the shell side and leaves the absorbent chiller 109 as a vapor by way of suction line 140. A controlled fraction of the suction vapor required to bypass the main compressor 144 is bled by proportioning bypass valve 141 while the remaining suction vapor goes to the main compressor 144 by way of suction line 143. On its way to the main compressor the vapor passes through liquid-vapor suction line heat exchanger 142 where it is superheated thereby causing a subcooling of the liquid refrigerant. The control system is designed to ensure a desired degree of superheating of the suction vapor depending upon the refrigerant characteristics. The suction vapor compressed by the main compressor 144 then follows the discharge line 145 and is led to the cascade heat exchanger 146 where it condenses on the shell side. In the cascade heat exchanger 146 the second refrigerant condensing on the shell side loses heat to third refrigerant evaporating on the tube side. This evaporating refrigerant is later compressed by a heat pump system (third heat pump means) for providing the heat required in freeze-drying process or elsewhere. The refrigerant condensed on the shell side of the cascade heat exchanger 146 is passed through line 147 to reach expansion valve 148 and is subcooled in the liquid-vapor suction line cooling medium subcooler 142. On its way it may be preferably subcooled in a heat exchanger (not shown) by losing heat to a natural heat sink such as cooling water. Depending upon the prevailing temperature conditions and some other thermodynamic considerations, the sequence of subcooling in the cooling medium subcooler and in the liquid-vapor suction line heat exchanger 142 may be interchanged. After subcooling, the liquid refrigerant is expanded on the shell side of the chiller 109 where it evaporates and leaves by way of suction line 140.

The fraction of suction vapor bled by the proportioning bypass valve 141 is likewise superheated in suction line heat exchanger 142B and passed along suction line 143B for compression by means of booster compressor booster 144B. This compressed refrigerant vapor leaves the compressor by way of discharge line 145B and is condensed in condenser 146B by losing heat to a natural heat sink such as cooling water. On its way to the expansion valve 148B by way of liquid line 147B the liquid refrigerant is subcooled in the liquid-vapor suction line heat exchanger 142B which also ensures an adequate super heating of the suction vapor compressed by booster compressor 144B. The expansion valve 148B expands this subcooled liquid refrigerant on the shell side of the chiller 109 where it evaporates together with liquid refrigerant returning from the cascade heat exchanger 146.

The temperature and concentration of the chilled absorbent solution leaving the chiller 109 through line 110 and its rate of recirculation are suitably controlled by properly interlinked control systems in order to maintain the desired vacuum in the system while avoiding any problems of absorbent solution freeze-up.

Figure 3:
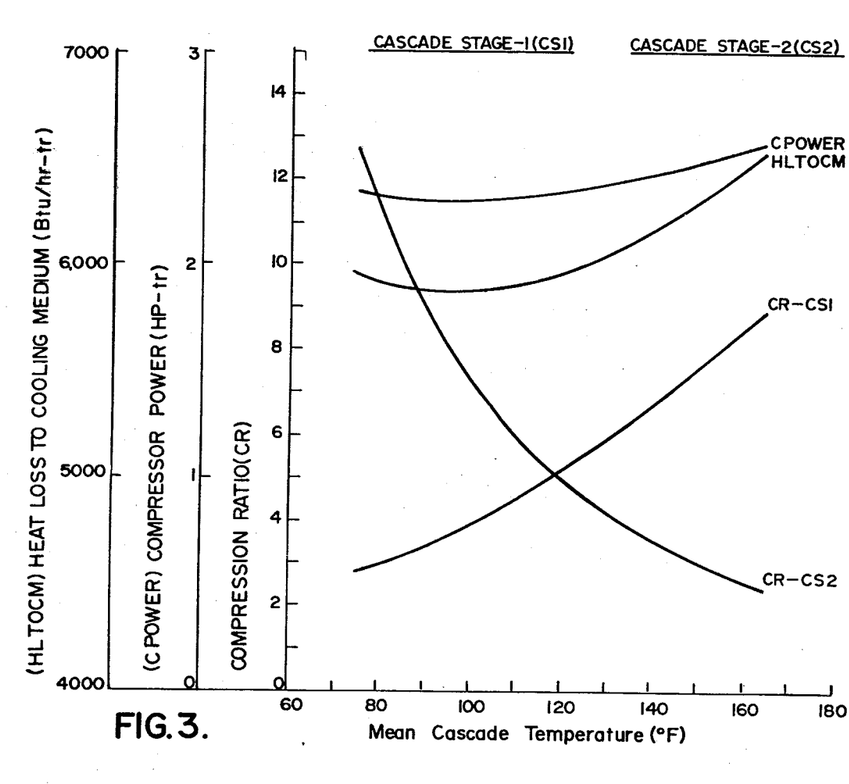
FIG. 3 is a graph showing the influence of mean cascade temperature on the performance of the cascade heat pump system.

The condensation and evaporation temperatures in cascade heat exchanger 146 should be maintained at levels permiting an optimum performance. This optimum condensation temparature depends upon thermodynamic considerations and may turn out to be higher than needed for the natural heat sink such as cooling water. This eventuality is highly probable in a cascade heat pump (comprising of second and third heat pump means), employing for example Freon 12 in the first cascade stage (the second heat pump means) and Freon 113 in the second cascade stage (the third heat pump means), with a suction saturation temperature of the refrigerant vapor in first cascade stage equal to −6.5° C (20.38° F) and the discharge saturation temperature of the refrigerant vapor in second cascade stage being equal to 104° C (218.80° F) and for a cooling water temperature of 27° C (80° F), a cascade temperature difference of about 5° C, a terminal difference of at least 5° C and various isentropic efficiencies. The results for 80 % efficiency are shown in FIG. 3 where the compression ratio of cascade stages, the total power required to drive the compressors and the required rate of heat dissipation to the cooling water are plotted against mean cascade temperature. From refrigeration engineering and thermodynamic considerations it is obvious that a mean cascade temperature of about 50° C is compatible with the optimum performance which indeed is much higher than the temperature level of 32°–38° C which can be maintained by the natural cooling medium. In such cases, the main compressor 144 and booster compressor 144B are both needed to increase power economy. However, if one is willing to sacrifice thermodynamic gains coming from the use of the main as well as the booster compressor, it is possible to compress in the main compressor 144 all the low pressure refrigerant vapor coming from the refrigerant evaporator 109 and then bleed the compressed refrigerant vapor rather than the low pressure vapor at a properly controlled rate for condensing it by losing heat to a natural heat sink. This liquid refrigerant formed by condensing the compressed bled vapor is subsequently returned to the shell side of the absorbent chiller 109 in the same manner as for the liquid refrigerant formed by condensing the bled suction vapor after compression in the booster compressor 144B. The remaining compressed vapor as in the previous case condenses on the shell side of the cascade heat exchanger 146.

The evaporating third refrigerant in the cascade heat exchanger 146 gains heat from the compressed second refrigerant vapor of the absorbent refrigeration system (second heat pump means) condensing on the shell side of the heat exchanger 146. The second condensing and evaporating third refrigerants in the cascade heat exchanger 146 are different when the thermodynamic or mechanical reasons so demand. The vapor of the evaporating refrigerant leaves the cascade heat exchanger by way of suction line 150 and a properly controlled portion of this suction vapor may be bled by means of proportioning bypass valve 184A while the remaining vapor passes along suction line 151 through a liquid-vapor suction line heat exchanger 152 where it gains heat from returning subcooled liquid refrigerant. The suction vapor is superheated to the desired level and led, via suction line 153 to the compressor 154, the compressed refrigerant vapor is led from the compressor 154 by discharge line 155 to the heat exchanger means in the vacuum drying process where it condenses at the desired temperature, for example 100°–150° C to provide heat in the vacuum drying chamber and/or the separation equipment, and the condensate still at high temperature may be further used to supply process heat whereby it is subcooled (first stage subcooling). This partially subcooled liquid refrigerant passes along liquid line 160 and is further subcooled (second stage subcooling) in cooling medium subcooler 161 by losing heat to a natural heat sink such as cooling water. The refrigerant in liquid line 162 is subsequently subcooled again (third stage subcooling) in liquid-vapor suction line heat exchanger 152 and depending upon the prevailing temperature conditions and some other thermodynamic considerations, the sequence of subcooling in liquid-vapor suction line heat exchanger 152 and in the cooling medium subcooler 161 may be interchanged or one or more of the first and second stages of subcooling may be eliminated. The liquid refrigerant is subsequently expanded by expansion valve 163 on the tube side of the cascade heat exchanger 146 where it evaporates by gaining heat from refrigerant vapor compressed by the main compressor 144 of the absorbent refrigeration system condensing on the shell side of the heat exchanger 146. Under steady state conditions, the proportioning bypass valve 141 would bleed just the right quantity of low pressure refrigerant vapor coming by way of suction line 140 to leave a sufficient quantity of refrigerant vapor for compression by the main compressor 144 in order to provide an adequate heat source to the third heat pump means.

When the saturation temperature of the low pressure suction vapor leaving cascade heat exchanger 146 is greater than the temperature of the natural heat sink, e.g. cooling water, it is sometimes simpler although less advantageous in the thermodynamic sense to adapt the following alternative scheme of balancing the system. The portion of the low pressure suction vapor leaving the cascade heat exchanger 146 is allowed to bypass the main compressor 154 of the third heat pump means. The bypassed fraction is controlled by a proportioning bypass valve 184A and is condensed by exchanging heat in a condenser 185A. The resulting liquid refrigerant is then returned by a pump 186A through check valve 187A and expanded by expansion valve 188A on the tube side of the cascade heat exchanger 146 where it evaporates together with the liquid refrigerant returning from the heat exchanger means and expanded by expansion valve 163.

The water vapor condensing for example at 55° C on the tube side of the water vapor condenser 190 serves as a heat source for the first refrigerant evaporating on the shell side, and the absorbent regenerating on the tube side in the regenerator 130 serves as a heat sink for the compressed first refrigerant vapor condensing for example at 104° C on the shell side of the regenerator 130. A heat pump system (first heat pump means) couples together the cascade condenser 190 condenser which serves as the water vapor condenser and the absorbent regenerator 130. The liquid first refrigerant leaves the heat pump condenser 130 and passes through liquid line 177 to subcooler 178 where it loses heat to a cooling medium which may be a natural heat sink such as cooling water or some other medium which needs to be heated and is thereby subcooled. The liquid refrigerant then passes through liquid line 179 and is further subcooled in passing through liquid-vapor suction line heat exchanger 172 which ensures an adequate superheating of the suction vapors. Again, the sequence of subcooling in the cooling medium subcooler 178 and in the liquid-vapor suction line heat exchanger 172 may be interchanged if so required by the prevailing temperature condition or some other thermodynamic considerations. The subcooled liquid refrigerant passes along liquid line 180, is then expanded by an expansion valve 181 and enters the water vapor condenser 190 on the shell side by way of line 182. The first refrigerant vapor leaves the water vapor condenser 190 by way of suction line 170. At this stage a portion of the suction vapor is bled by means of proportioning bypass control valve 184. The unbled fraction of suction vapor follows suction line 171 and after sufficient superheating in passing through the liquid-vapor suction line heat exchanger 172 follows the suction line 173 to heat pump compressor 174. After compression the refrigerant vapor is discharged along line 175 and the compressed refrigerant vapor condenses on the shell side of the regenerator 130. Size of the bled fraction of the suction vapor is controlled by the proportioning bypass valve 184 to allow sufficient unbled suction vapor to be compressed by the heat pump compressor 174 in order to match the heat requirement in the regenerator 130 at all times. The bled fraction is liquified in passing through a condenser 185 by losing heat to a cooling medium which may be a natural heat sink such as cooling water. The resultant refrigerant is then returned by pump 186 through check valve 187 and expanded by expansion valve 188 into the shell side of cascade condenser 190 where it evaporates together with liquid refrigerant returning from regenerator 130.

Under steady state operating conditions the partial pressure of noncondensible gases in the system is maintained at a desired level by means of purge unit 197 which pumps the uncondensible gases from the absorber 100, evaporator 130 and condenser 190 via lines 195 and 196. In operation the pressure in the vacuum chamber is lowered to the desired value by means of pump 197 through line 101 and the absorbent is recirculated through absorber 100 and when the desired low pressure has been achieved the valve 102 in line 101 is adjusted to provide the necessary pressure differential between the pressure in the chamber and the pressure in the absorber 100.

When the evacuation system of the present invention is used in a vacuum drying process other than a freeze-drying process, where the water vapor pressure in the absorber 100 is above the triple point so that the water vapor extracted from the chamber 51 condenses in the liquid phase rather than the solid phase when contacted with chilled water, and consequently the water vapor may be directly condensed in the absorber 100 by means of a spray of chilled water which would be continuously chilled by being circulated through chiller 109 by means of pump 105. As the regeneration by evaporation of the liquid (chilled water) becomes superfluous the valve 111 would be fully closed and the regenerator 130 and condenser 190 and their associated heat pump system (first heat pump means) is superfluous. From the condensing water being removed from the absorber by pump 105 a portion equivalent to the amount of water vapor condensed into it is removed, preferably before it reaches the chiller 109, in order to ensure steady state operation.

The present invention thus includes an evacuation system substantially eliminating the need to supply heat from an external heat source for continuously removing vapor from a vacuum drying chamber maintained at a vapor pressure above the triple point of the substance of the vapor as said vapor is generated in said chamber in the vacuum drying of the material, said system comprising an absorber through which liquid of said vapor is continuously passed, said liquid being at a sufficiently low temperature to provide in said absorber a pressure substantially lower than in said chamber but yet above the said triple point pressure, whereby to cause vapor to rapidly pass from said chamber to said absorber where it is condensed in said liquid, a chiller adapted to cool heated liquid from the absorber to the desired temperature for said absorber by heat exchange with evaporating refrigerant for passage to said absorber and a heat pump means adapted to compress at least a portion of low pressure refrigerant vapor from said chiller and pass compressed refrigerant to heat exchange means for heating the material in said chamber and passing condensed liquid refrigerant from said heat exchange means through an expansion valve into said chiller, said heat pump means including cooling means for removing excess heat from said refrigerant to maintain a heat balance in said chiller and in said chamber, and means for continuously removing said liquid at a rate corresponding to that at which said vapor is condensed in said absorber in order to maintain a steady state condition.

While the process of the present invention is primarily a freeze-drying process, it will be realized that in the chamber 51 whether freeze-drying occurs in a particular situation is a matter of pressure level of the vapors surrounding the drying substance and the process of the present invention is also applicable to vacuum drying including concentration of the material by partial removal of the liquid phase.

The present invention thus also provides a continuous method for vacuum drying a material which comprises introducing said material in particulate form into a drying chamber maintained at subatmospheric pressure whereby said material passes through said chamber, heating said particulate material in said chamber to cause vaporization of at least a portion of the liquid in the material and continuously withdrawing vapor from said chamber and condensing said vapor at a pressure lower than that maintained in said chamber.

It will be noted that in the evacuation system of the present invention involving the refrigeration and heat pump system, there is no need for an external heat source. It has also reduced the need for a natural heat sink to the minimal quantity required for the condenser 146B used for condensing the bled second refrigerant vapor compressed by the booster compressor 144B of the absorbent refrigeration (second heat pump) system. The small quantity of cooling water required by comparison with the conventional freeze-drying system is responsible for savings in circulating pumps and cooling towers etc. Furthermore the condensers such as 185 and 185A, the subcoolers such as 161 and 178 and the condensate leaving the cascade condenser 190 at 194 are good and sizable potential sources of available heat.

The economic advantages of the present invention as compared with the most acceptable type of conventional freeze-drying system in commercial use at the present time namely one drawing central utility services and a multicabinet installation with removable cars is inter alia savings of up to about 35% are feasible in the investment on utility equipment, power consumption is reduced by an amount up to about 70%, the cooling tower capacity requirements are reduced by an amount up to about 80%, the need for supplying sublimation heat is substantially completely eliminated, there being just a small increase in the total refrigeration requirements of about 5%. The cost of freeze-drying has been estimated by the process of the present invention to be on the order of 15% as compared with the cost of freeze-drying by the conventional freeze-drying process on the basis of water removed.

The process of the present invention has the following additional advantages over the conventional freeze-drying processes, namely:

a. A higher throughput is possible for a given physical size of the plant and floor space due to the continuity of the operation, particularly when atomization is used in conjunction with the freeze-drying.

b. The continuous vacuum pumping operation usable with the process of the present invention eliminates down time usually necessitated by frosting and defrosting operations with conventional surface condensers and also eliminates considerable losses of energy and power for defrosting and subsequently recooling of the conventional condensing surfaces up to the required low temperature. The power thus saved becomes more significant as the frosting and defrosting cycle becomes shorter in order to save down time.

c. In the conventional freeze-drying plants the shell and other parts and equipment inside the chamber have to be cooled down to approximately the final temperature of the frozen substance. Subsequently these have to be heated from this low temperature to a high temperature in order to provide heat for sublimation. Depending upon the heat capacity of the chamber and its interior equipment the power and energy wasted in this inevitable cooling and heating can be quite significant. It is indeed of the same order of magnitude as the energy and power usefully employed in the freeze-drying operation itself. Such a waste of processing energy and power and also of time is almost completely eliminated by the process of the present invention.

d. Conventional freeze-drying plants in which the frozen substance is transferred to a drying chamber require the freezers to operate at much lower temperatures than otherwise necessary in order to ensure that the temperature of the frozen mass remains below the minimum temperature of incipient melting before proper freeze-drying conditions e.g. vacuum etc. can be established in the drying chamber. A temperature allowance of at least 10° C has to be made to counterbalance the temperature rise of the frozen substance during its transportation to the drying temperature and during the loading operations. This need for a low temperature increases the refrigeration requirements and the power per ton of refrigeration. For example a 5° C decrease in temperature will necessitate a power increase of about 15 to 20% per ton of refrigeration while the refrigeration load itself will increase. Moreover, the refrigeration capacity per cubic foot per minute of refrigeration suction vapor decreases by about 20 to 25%. The overall effect for a 5° C decrease in temperature amounts to 20–30% increase in power required and a 20–25% increase in size of refrigeration equipment. In the process of the present invention there is no refrigeration requirement for freezing the product. With the product frozen outside the drying chamber there is a danger of its temperature rising above the minimum temperature of incipient melting before a good vacuum can be established in the drying chamber. Thus there is a need for an oversized vacuum pumping system in conventional freeze-drying plants.

e. Because of its continuous operation the process of the present invention presents no need for breaking the vacuum in the drying chamber and this results in savings in power and equipment size and also reduces to a minimum the demand of the inert gas required for breaking the vacuum.

f. The process of the present invention renders it feasible to freeze-dry foods of relatively low commercial value and produce a finished product with a low final moisture content.

I claim:

1. A freeze-drying system for freeze-drying a material, said material comprising a substance to be removed to effect freeze-drying of said material, which system substantially eliminates need to supply heat from an external heat source for freeze-drying said material; said system comprising in combination:

a. a drying chamber wherein is maintained a vapor pressure below the triple point pressure of substance to be removed to effect freeze-drying of said material;

b. a means for passing the said material through said drying chamber for freeze-drying thereof during said passage;

c. an evacuation means for continuously removing vapor from said drying chamber as it is generated in said chamber in the freeze-drying of said material, said evacuation means comprising an absorber through which a liquid absorbent medium is continuously passed, said absorbent medium being at a sufficiently low temperature to provide in said absorber a vapor pressure lower than in said chamber whereby to cause the vapor to pass from said drying chamber to said absorber where it is absorbed in said absorbent medium; an evaporator in which absorbed substance is continuously evaporated from the absorbent medium passing therethrough from said absorber at a rate similar to that at which said vapor is absorbed in said absorbent medium in said absorber, by heat exchange with condensing first refrigerant; a condenser in which vapor from said evaporator is condensed by heat exchange with evaporating first refrigerant; a first heat pump means adapted to compress at least a portion of first refrigerant vapor from said condenser, pass first refrigerant vapor so compressed to said evaporator and pass condensed first refrigerant from said evaporator through an expansion valve to said condenser, said first heat pump means including a cooling means for removing excess heat from said first refrigerant to maintain heat balance in said evaporator and in said condenser; a chiller in which the absorbent medium from said evaporator is cooled to restore the absorbent medium to the proper temperature for said absorber for passage to said absorber, by heat exchange with evaporating second refrigerant; and a means to maintain the absorbent medium in circulation between said absorber, evaporator, and chiller; and a means to purge the noncondensible gases from the system;

d. a second heat pump means adapted to compress at least a portion of second refrigerant vapor from said chiller, pass the second refrigerant vapor so compressed to a heat exchange means for supplying heat to effect freeze-drying of said material in said drying chamber and pass condensed second refrigerant from heat exchange means through an expansion valve to said chiller, said second heat pump means including a cooling means for removing excess heat from said second refrigerant to maintain heat balance in said heat exchange means and in said chiller.

2. A system as claimed in claim 1 in which said heat exchange means comprises:
a. a cascade heat exchanger in which compressed vapor of second refrigerant is heat exchanged with an evaporating third refrigerant;
b. a heat exchanger means in which compressed third refrigerant vapor is condensed to supply heat for effecting freeze-drying of said material;
c. a third heat pump means adapted to compress at least a portion of third refrigerant vapor from said cascade heat exchanger, pass the third refrigerant vapor so compressed to said heat exchanger means and pass condensed third refrigerant from said heat exchanger means through an expansion valve to said cascade heat exchanger, said third heat pump means including a cooling means for removing excess heat from said third refrigerant to maintain heat balance in said heat exchanger means and in said cascade heat exchanger.

3. A system as claimed in claim 1 for use in freeze-drying a material in which said substance is water, said vapor is substantially water vapor, and in which the absorbent is an aqueous solution of a water vapor pressure depressant.

4. A system as claimed in claim 1 in which said means for passing said material through said drying chamber comprises a means for introducing said material into said drying chamber, a means for retaining said material in said drying chamber for a period sufficient to effect drying of said material to the desired moisture content, and a means for removing the dried material from said drying chamber.

5. A system as claimed in claim 4 in which said material is particulate and frozen.

6. A system as claimed in claim 4 in which said material is atomizable and in which the means for introducing said material into said drying chamber comprises a means for atomizing said material in said drying chamber wherein said atomized material freezes due to prevailing low vapor pressure, said chamber being of a sufficient size and said material being atomized at a location to cause the frozen material to be substantially dried while suspended in said drying chamber.

7. A vacuum drying system for vacuum drying a material, said material comprising a substance to be removed to effect vacuum drying of said material, which system substantially eliminates need to supply heat from an external heat source for vacuum drying said material; said system comprising in combination:
a. a drying chamber wherein is maintained a subatmospheric pressure to effect vacuum drying of said material;
b. a means for passing the said material through said drying chamber for vacuum drying thereof during said passage;
c. an evacuation means for continuously removing vapor from said drying chamber as it is generated in said chamber in the vacuum drying of said material, said evacuation means comprising an absorber through which a liquid absorbent medium is continuously passed, said absorbent medium being at a sufficiently low temperature to provide in said absorber a vapor pressure lower than in said chamber whereby to cause the vapor to pass from said drying chamber to said absorber where it is absorbed in said absorbent medium; an evaporator in which absorbed substance is continuously evaporated from the absorbent medium passing therethrough from said absorber at a rate similar to that at which said vapor is absorbed in said absorbent medium in said absorber, by heat exchange with condensing first refrigerant; a condenser in which vapor from said evaporator is condensed by heat exchange with evaporating first refrigerant; a first heat pump means adapted to compress at least a portion of first refrigerant vapor from said condenser, pass first refrigerant vapor so compressed to said evaporator and pass condensed first refrigerant from said evaporator through an expansion valve to said condenser, said first heat pump means including a cooling means for removing excess heat from said first refrigerant to maintain heat balance in said evaporator and in said condenser; a chiller in which the absorbent medium from said evaporator is cooled to restore the absorbent medium to the proper temperature for said absorber for passage to said absorber, by heat exchange with evaporating second refrigerant; a means for maintaining the absorbent medium in circulation between said absorber, evaporator, and chiller; and a means to purge the noncondensible gases from the system;
d. a second heat pump means adapted to compress at least a portion of second refrigerant vapor from said chiller, pass the second refrigerant vapor so compressed to a heat exchange means for supplying heat to effect vacuum drying of said material in said drying chamber and pass condensed second refrigerant from said heat exchange means through an expansion valve to said chiller, said second heat pump means including a cooling means for removing excess heat from said second refrigerant to maintain heat balance in said heat exchange means and in said chiller.

8. A system as claimed in claim 7 in which said heat exchange means comprises:
  a. a cascade heat exchanger in which compressed vapor of second refrigerant is heat exchanged with an evaporating third refrigerant;
  b. a heat exchanger means in which compressed third refrigerant vapor is condensed to supply heat for effecting vacuum drying of said material;
  c. a third heat pump means adapted to compress at least a portion of third refrigerant vapor from said cascade heat exchanger, pass the third refrigerant vapor so compressed to said heat exchanger means and pass condensed third refrigerant from said heat exchanger means through an expansion valve to said cascade heat exchanger, said third heat pump means including a cooling means for removing excess heat from said third refrigerant to maintain heat balance in said heat exchanger means and in said cascade heat exchanger.

9. A system as claimed in claim 8 including a subcooling means between the said heat exchanger means and the said expansion valve through which said condensed third refrigerant passes from said heat exchanger means to said cascade heat exchanger, said subcooling means supplying heat to a heat sink external to the said third heat pump means for the purpose of subcooling control.

10. A system as claimed in claim 8 in which the cooling means in said third heat pump means comprises a means for condensing a portion of the low pressure refrigerant vapor by heat exchange with a heat sink and a means for recycling the so condensed refrigerant to said cascade heat exchanger.

11. A system as claimed in claim 7 in which a vapor pressure below the triple point pressure of said substance to be removed is maintained in said drying chamber to effect freeze-drying of said material.

12. A system as claimed in claim 7 in which the cooling means in said first heat pump means comprises a means for condensing a portion of the low pressure refrigerant vapor by heat exchange with a heat sink and a means for recycling the so condensed refrigerant to said condenser.

13. A system as claimed in claim 7 in which the cooling means in said second heat pump means comprises a means for condensing a portion of the low pressure refrigerant vapor by heat exchange with a heat sink and a means for recycling the so condensed refrigerant to said chiller.

14. A system as claimed in claim 7 including a subcooling means between the said evaporator and the said expansion valve through which said condensed first refrigerant passes from said evaporator to said condenser, said subcooling means supplying heat to a heat sink external to the said first heat pump means for the purpose of subcooling control.

15. A system as claimed in claim 7 including a subcooling means between the said heat exchange means and the said expansion valve through which said condensed second refrigerant passes from said heat exchange means to said chiller, said subcooling means supplying heat to a heat sink external to the said second heat pump means for the purpose of subcooling control.

16. A system as claimed in claim 7 for use in vacuum drying a material in which said substance is water, said vapor is substantially water vapor, and in which the absorbent is an aqueous solution of a water vapor pressure depressant.

17. A system as claimed in claim 7 including a separator between said drying chamber and said evacuation means, said separator being adapted to remove partially dried particulate material entrained in vapor passing therethrough and a means for supplying heat to said separator to effect drying of said particulate material, said heat being supplied by one of the heat pump means of said drying system.

18. A system as claimed in claim 7, in which said means for passing said material through said drying chamber comprises a means for introducing said material into said drying chamber, a means for retaining said material in said drying chamber for a period sufficient to effect drying of said material to the desired moisture content, and a means for removing the dried material from said drying chamber.

19. A system as claimed in claim 18 in which said material is particulate.

20. A system as claimed in claim 18 in which said material is atomizable and in which the means for introducing said material into said drying chamber comprises a means for atomizing said material in said drying chamber, said chamber being of a sufficient size and said material being atomized at a location to cause the atomized material to be substantially dried while suspended in said drying chamber.

21. A vacuum drying system for vacuum drying of a material, said material comprising a substance to be removed to effect vacuum drying of said material, which system substantially eliminates need to supply heat from an external heat source for vacuum drying said material; said system comprising in combination:
  a. a drying chamber wherein is maintained a subatmospheric pressure, the vapor pressure in the drying chamber being maintained above the triple point pressure of substance to be removed to effect vacuum drying of said material:
  b. a means for passing the said material through said drying chamber for vacuum drying thereof during said passage;
  c. an evacuation means for continuously removing vapor from said drying chamber as it is generated in said chamber in the vacuum drying of said material, said evacuation means comprising an absorber through which liquid of said vapor is continuously passed, said liquid being at a sufficiently low temperature to provide in said absorber a vapor pressure substantially lower than in said drying chamber but yet above the said triple point pressure whereby to cause vapor to pass from said drying chamber to said absorber where it is condensed in said liquid; a chiller adapted to cool the said liquid from said absorber to a proper temperature for said absorber for passage to said absorber, by heat exchange with evaporating second refrigerant; a means to maintain the said liquid in circulation between said absorber and chiller; and a means to purge the noncondensible gases from the system;
  d. a second heat pump means adapted to compress at least a portion of second refrigerant vapor from said chiller, pass so compressed second refrigerant vapor to a heat exchange means for supplying heat to effect vacuum drying of said material in said drying chamber and pass condensed second refrigerant from said heat exchange means through an expansion valve to said chiller, said second heat pump means including a cooling means for removing excess heat from said second refrigerant to maintain heat balance in said heat exchange means and in said chiller;

e. and a means for continuously removing liquid at a rate corresponding to that at which said vapor is condensed in said absorber to prevent the accumulation of said liquid in said absorber.

22. A system as claimed in claim 21 in which said heat exchange means comprises:
a. a cascade heat exchanger in which compressed vapor of second refrigerant is heat exchanged with an evaporating third refrigerant;
b. a heat exchanger means in which compressed third refrigerant vapor is condensed to supply heat for effecting vacuum drying of said material;
c. a third heat pump means adapted to compress at least a portion of third refrigerant vapor from said cascade heat exchanger, pass the third refrigerant vapor so compressed to said heat exchanger means and pass condensed third refrigerant from said heat exchanger means through an expansion valve to said cascade heat exchanger, said third heat pump means including a cooling means for removing excess heat from said thrid refrigerant to maintain heat balance in said heat exchanger means and in said cascade heat exchanger.

23. A heat pump system adapted to continuously withdraw heat from a heat source and continuously deliver heat at a required rate to a heat sink such that the ratio of heat withdrawn to heat delivered may be controlled by a cooling means, said heat pump system comprising a compressor adapted to compress at least a portion of refrigerant vapor from an evaporator thereof wherein a refrigerant withdraws heat from said heat source, a condenser in which refrigerant vapor so compressed is condensed and delivers heat at the required rate, cooling means for balancing the rates of heat delivery and heat withdrawal, an expansion valve for expanding liquid refrigerant from said condenser into said evaporator, and a liquid-vapor suction line heat exchanger for adequately superheating the portion of refrigerant vapor prior to its compression in the said compressor,.

24. A system as claimed in claim 1 in which the cooling means comprises a heat exchanger between said condenser and said expansion valve adapted to remove excess heat from condensed refrigerant to an external heat sink for the purpose of subcooling control.

25. A system as claimed in claim 1 in which the cooling means comprises means for condensing a portion of the low pressure refrigerant vapor by heat exchange with a heat sink and a means for recycling the so condensed refrigerant to said evaporator.

26. A heat pump system adapted to continuously withdraw heat from a heat source and to continuously deliver heat at the required rate to a heat sink such that the ratio of heat withdrawn to heat delivered may be controlled by a cooling means, said heat pump system comprising a combination of means through which a refrigerant is circulated, said combination of means including an evaporator wherein the said refrigerant withdraws heat from said heat source, a bleeding means for bleeding a portion of low pressure refrigerant vapor coming from said evaporator, a compressor adapted to compress the remaining unbled portion of refrigerant vapor coming from said evaporator, a condenser in which the refrigerant vapor so compressed is condensed and delivers heat the required rate to said heat sink, a cooling means for balancing the rates of heat delivery and heat withdrawal, an expansion valve for expanding the condensed refrigerant from said condenser into said evaporator, and a liquid-vapor suction line heat exchanger for adequately superheating the unbled portion of refrigerant vapor prior to compression thereof in said compressor 27. A system as claimed in claim 26 including a subcooling means between said condenser and said expansion valve adapted to remove excess heat from said condensed refrigerant to a heat sink external to the said heat pump system for the purpose of subcooling control.

28. A system as claimed in claim 26 in which the said cooling means comprises a means for condensing the said bled portion of low pressure refrigerant vapor by heat exchange with a heat sink external to the said heat pump system, and a means for recycling the so condensed refrigerant to said evaporator.

29. An evacuation system substantially eliminating the need to supply heat from an external heat source for continuously removing vapor from a vacuum drying chamber maintained at a pressure above the triple point of the substance of the vapor as said vapor is generated in said chamber in the vacuum drying of a material, said system comprising an absorber through which liquid of said vapor is continuously passed; said liquid being at a sufficiently low temperature to provide in said absorber a pressure substantially lower than in said chamber but yet above the said triple point pressure whereby to cause vapor to rapidly pass from said chamber to said absorber where it is condensed in said liquid, a chiller adapted to cool heated liquid from the absorber to the desired temperature for said absorber by heat exchange with evaporating refrigerant for passage to said absorber and a heat pump means adapted to compress at least a portion of low pressure refrigerant vapor from said chiller and pass so compressed refrigerant vapor to a heat exchange means for heating the material in said chamber and passing condensed liquid refrigerant from said heat exchange means through an expansion valve to said chiller; said heat pump means including a cooling means for removing excess heat from said refrigerant to maintain a heat balance between said chiller and said chamber, and a means for continuously removing said liquid at a rate corresponding to that at which the said liquid is formed by condensing vapor in said absorber in order to maintain a steady state condition.

30. A system as claimed in claim 29 in which the liquid is water.

31. A system as claimed in claim 29, in which said heat exchange means comprises a cascade heat exchanger in which said compressed refrigerant vapor is heat exchanged with an evaporating third refrigerant and a third heat pump means adapted to compress at least a portion of the vapor of the third refrigerant from said cascade heat exchanger and pass compressed third refrigerant vapor to a heat exchanger means in said chamber for heat exchange with material therein and pass condensed liquid third refrigerant from said heat exchanger means in said chamber through an expan- 
sion valve to said cascade heat exchanger, said third heat pump means including a cooling means for removing excess heat from said third refrigerant to maintain a heat balance between the said cascade heat exchanger and the said heat exchanger means in the chamber.

32. A system as claimed in claim 31 in which the cooling means of the said heat pump means comprises a means for condensing a portion of the low pressure refrigerant vapor by heat exchange with a heat sink and a means for recycling the so condensed refrigerant to the chiller; and the cooling means of the third heat pump means comprises a means for condensing a portion of the low pressure third refrigerant vapor by heat exchange with a heat sink and a means for recycling the so condensed refrigerant to the cascade heat exchanger.

33. An evacuation system substantially eliminating the need to supply heat from an external heat source for continuously removing vapor from a vacuum drying chamber as it is generated in said chamber in the vacuum drying of a material, said system comprising an absorber through which a liquid absorbent medium is continuously passed, said absorbent medium being at a suficiently low temperature to provide in said absorber a vapor pressure substantially lower than in said chamber whereby to cause vapor to rapidly pass from said chamber to said absorber where it is absorbed in said absorbent medium, an evaporator in which liquid is continuously evaporated from the absorbent medium passing therethrough from said absorber at a rate similar to that at which said vapor is absorbed in said absorbent medium in said absorber, by heat exchange with condensing first refrigerant, a condenser in which vapor from said evaporator is condensed by heat exchange with evaporating first refrigerant, first heat pump means adapted to compress at least a portion of first refrigerant vapor from said condenser, pass first refrigerant vapor so compressed to said evaporator and pass condensed first refrigerant from said evaporator through an expansion valve to said condenser, said first heat pump means including cooling means for removing excess heat from said first refrigerant to maintain a heat balance between the evaporator and condenser, and a chiller adapted to cool heated absorbent medium from said evaporator to restore the absorbent medium to the desired temperature for said absorber for passage to said absorber.

34. A system as claimed in claim 33, in which the heated absorbent medium is cooled in the chiller by heat exchange with evaporating second refrigerant and which system includes second heat pump means adapted to compress at least a portion of second refrigerant vapor from said chiller and pass the second refrigerant vapor so compressed to heat exchange means for heating the material in said chamber and passng condensed second refrigerant from said heat exchange means through an expansion valve to said chiller, said second heat pump means including cooling means for removing excess heat from said second refrigerant to maintain a heat balance between said chiller and said chamber.

35. A system as claimed in claim 34 in which said heat exchange means comprises a cascade heat exchanger in which compressed vapor of the second refrigerant is heat exchanged with an evaporating third refrigerant and third heat pump means adapted to compress at least a portion of the vapor of the third refrigerant from said cascade heat exchanger, pass the compressed vapor of the third refrigerant to a heat exchanger means of said chamber for heat exchange therein and pass condensed liquid third refrigerant from said heat exchanger means through an expansion valve to said cascade heat exchanger, said third heat pump means includng a cooling means for removing excess heat from said third refrigerant to maintain heat balance between the said cascade heat exchanger and the said heat exchanger means of the said chamber.

36. A system as claimed in claim 35 in which the cooling means in said third heat pump means comprises a means for condensing a portion of the low pressure refrigerant vapor by heat exchange with a heat sink and a means for recycling the so condensed refrigerant to the said heat exchanger.

37. A system as claimed in claim 34 in which the cooling means in said second heat pump means comprises a means for condensing a portion of the low pressure refrigerant vapor by heat exchange with a heat sink and a means for recycling the so condensed refrigerant to the said chiller.

38. A system as claimed in claim 34, including a heat exchanger between the said chamber and the said expansion valve for supplying heat to an external heat sink for the purpose of subcooling control.

39. A system as claimed in claim 34 for use in freeze-drying a material in which the vapor is water vapor and in which the absorbent is an aqueous solution of a water vapor pressure depressant.

40. A system as claimed in claim 39 in which the absorbent is an aqueous solution of lithium bromide.

41. In combination with a vacuum drying chamber, an evacuation system as claimed in claim 33.

42. The combination as claimed in claim 41 in which the vacuum drying chamber comprises a chamber, a means for passing particulate frozen material through said chamber, a means for maintaining a subatmospheric vapor pressure in said chamber below the triple point pressure of ice whereby to cause sublimation of the ice from said frozen material and a means for introducing heat recovered and delivered by said heat pump means into said chamber, said chamber being of a sufficient size and said particulate material being introduced at a point to cause the frozen material to be substantially dried while suspended in said chamber.

43. The combination as claimed in claim 41 including a means for supplying microwave energy into said chamber to dry particulate material therein while said material is in suspension in said chamber.

44. The combination as claimed in claim 42 in which the chamber includes an atomizer for spraying droplets of an aqueous mixture of said material into said chamber which droplets freeze almost immediately to form said particulate material.

45. The combination as claimed in claim 44 including a separator between said chamber and said evacuation means, said separator being adapted to remove suspended partially dried particulate material entrained in the water vapor passng therethrough and a means for supplying heat recovered and delivered by said heat pump means to said separator to complete drying of said particulate material separated in said separator.

46. A system as claimed in claim 33 in which the cooling means in said first heat pump means comprises a means for condensing a portion of the low pressure refrigerant vapor by heat exchange with a heat sink and a means for recycling the so condensed refrigerant to said condenser.

47. A system as claimed in claim 33 including a heat exchanger between the said evaporator and the said expansion valve for supplying heat to an external heat sink for the purpose of subcooling control.

* * * * *